United States Patent [19]

Davidian

[11] Patent Number: 5,106,415
[45] Date of Patent: Apr. 21, 1992

[54] PROTECTIVE COATING COMPOSITION AND METHOD OF PRODUCING SAME

[75] Inventor: Michael Davidian, Oak Brook, Ill.

[73] Assignee: A.I.T. Inc., Ill.

[21] Appl. No.: 484,189

[22] Filed: Feb. 22, 1990

[51] Int. Cl.$^5$ .................................. C08L 91/06
[52] U.S. Cl. ....................... 106/14.24; 106/2; 106/14.05; 106/14.29; 106/14.33; 106/14.34; 106/14.35; 106/14.37; 106/14.38; 106/14.39; 106/14.41; 106/14.43; 106/14.44; 106/230; 106/245; 106/268; 106/270; 106/271; 106/272
[58] Field of Search ............... 106/14.05, 14.43, 14.33, 106/14.29, 271, 224, 272, 230, 245, 274, 268; 427/428, 429, 435, 443, 226, 422, 372.2, 374.1, 374.4, 385.5, 388.4, 388.5; 428/467, 470; 208/20, 21

[56] References Cited

U.S. PATENT DOCUMENTS

| | | | |
|---|---|---|---|
| ,917,893 | 11/1975 | Marshall et al. | 428/395 |
| 3,080,330 | 3/1963 | Rudel et al. | 106/14.29 |
| 3,746,643 | 7/1973 | Rogers | 106/14.29 |
| 3,804,744 | 4/1974 | Fera | 208/20 |
| 3,997,693 | 12/1976 | Kirschner | 427/384 |
| 4,002,706 | 1/1977 | Pretorius | 208/21 |
| 4,142,903 | 3/1979 | Antonelli, Sr. | 106/14.24 |
| 4,150,192 | 4/1979 | Downey | 428/462 |
| 4,371,446 | 2/1983 | Kinoshita et al. | 252/51.5 A |
| 4,482,387 | 11/1984 | Wood et al. | 106/270 |
| 4,548,854 | 10/1985 | Wach | 106/268 |
| 4,615,739 | 10/1986 | Clark et al. | 106/34 |
| 4,618,539 | 10/1986 | Jahuke et al. | 106/14.42 |
| 4,729,791 | 3/1988 | Laura et al. | 106/245 |
| 4,842,903 | 6/1989 | Hayner | 427/428 |
| 4,846,887 | 7/1989 | Kuchnle | 106/270 |
| 4,851,043 | 7/1989 | Dotson et al. | 106/14.11 |
| 4,857,578 | 8/1989 | Hall | 106/245 |

OTHER PUBLICATIONS

"The Chemical Formulary", H. Bennett, vol. I-XIX (1976).

*Primary Examiner*—William R. Dixon, Jr.
*Assistant Examiner*—Scott L. Hertzog

[57] ABSTRACT

A protective coating composition for metal articles comprising a flowable mixture of finely divided wax particles having a melting point in the range of 120° to 350° F. in a liquid oil. The composition can also contain finely divided particles of an inert filler and an anticorrosion agent. The composition is applied to the article and heated to a temperature in the range of 150° F. to 400° F. to provide a homogeneous liquid coating. On cooling to ambient temperature, a solid adherent coating results.

22 Claims, No Drawings

5,106,415

PROTECTIVE COATING COMPOSITION AND METHOD OF PRODUCING SAME

BACKGROUND OF THE INVENTION

Ferrous metal articles are subjected to corrosion when exposed to moisture, salt, and oxygen. Various types of protective coatings have been applied to ferrous articles in the past to resist corrosion. Initially, the protective coatings consisted of grease or oil but coatings of this type are of limited effectiveness. Subsequently, solvent-type coatings were employed in which a coating material was dissolved in an organic solvent. After application of the coating solution to the article, the solvent or carrier is evaporated to provide a firm and relatively non-greasy coating. However, solvent-type coatings have become less popular due to the environmental concerns in handling the solvent. Not only do solvent-type coatings require the use of expensive pollution control equipment, but the solvents provide a hazard to personnel.

Water-base coatings have also been employed which overcome the pollution problems associated with solvent-type coatings. However, water-base coatings have a serious disadvantage in requiring substantially longer drying times than the solvent-base counterparts.

Thermosetting resin coatings have also been utilized as protective coatings. However, these systems require the mixing of two reactive components and pose hazards in various degrees to personnel. In addition, the thermosetting resin coatings are relatively expensive and require the use of heat to accelerate the reaction between the components.

Hot melt dips have also been employed to provide protective coatings on ferrous articles. The use of a hot melt dip requires that large vats of molten material be maintained at high temperatures. Thus, the hot melt system requires substantial capital expenditures as well as emission control equipment. In addition, a hot melt dip provides difficulty in controlling the film thickness and there are also product stability concerns due to high temperature aging.

A further type of coating as used in the past is a sprayable hot melt coating. However, sprayable hot melt coatings require expensive equipment such as drum unloaders, heated fluid lines, and special spray guns to prevent solidification of the molten coating material.

SUMMARY OF THE INVENTION

The invention is directed to a protective coating composition for metal articles which is based on the novel concept that a dispersion of finely divided wax particles in oil will solidify to form a solid, tough, adherent coating when heated to a temperature above the melting point of the wax. In general, the coating composition consists of 10% to 90% by weight of finely divided wax particles having a melting point in the range of 120° to 350° F., and a particle size in the range of 0.5 to 400 microns, and 10% to 90% of a liquid oil.

The composition can also contain up to 60% by weight of finely divided particles of an inert filler, and up to 60% by weight of finely divided particles of an anti-corrosive agent.

The liquid wax/oil dispersion is applied at ambient temperature to the article to be protected, and the article is then heated to a temperature in the range of 150° to 400° F., and above the melting temperature of the wax to provide a generally homogeneous liquid mass. When cooled, a virtually instantaneous solidification of the coating occurs to provide a tough, adherent, homogeneous, corrosion-resistant coating on the article.

In one form of the invention, the coating is sprayed onto the article via a spray nozzle which incorporates a heating element so that the dispersion is heated as it is sprayed from the nozzle onto the article. Alternately, the dispersion can be sprayed on the article and the coated article can then be dipped in a hot water tank or heated in an oven to the elevated temperature in the range of 150° to 400° F. to solidify the coating.

In a modified form of the invention, the article can be dipped in a tank of the wax/oil dispersion at room temperature, and the coated article can then be dipped in hot water tank or heated in an oven to the above-mentioned temperature. The coating is subsequently solidified by cooling to room temperature, or by dipping the metal part in cold water.

As the coating does not utilize an evaporable carrier, such as an organic solvent, the pollution problems normally associated with the use of a solvent are eliminated. Thus, emission control equipment is not required and personnel hazard is likewise eliminated.

Further, the coating of the invention, when applied to the metal article, will not shrink as does a coating utilizing an evaporable carrier.

As the coating of the invention is prepared and maintained at ambient temperature, it provides a substantial advantage over hot melt systems which require large vats of molten material to be maintained at high temperatures.

The coating system of the invention is particularly useful in high production applications for no drying time is required as the heated coating will solidify or set up virtually instantaneously upon cooling.

Other objects and advantages will appear in the course of the following description.

DESCRIPTION OF THE PREFERRED EMBODIMENT

The invention is directed to a corrosion-resistant composition for coating articles and particularly ferrous metal articles. The coating can be used in conjunction with any article which is subjected in service to a corrosive atmosphere, and has particular application for coating vehicle frames and bodies, caskets, and the like.

In general, the coating composition is a dispersion composed of 10 to 90% by weight of finely divided wax particles, and 10 to 90% by weight of a liquid oil.

The wax to be used in the composition of the invention preferably has a melting point in the range of 120° to 350° F., and a particle size in the range of 0.5 to 400 microns, and preferably in the range of 2 to 30 microns.

The particular wax to be employed is not critical and typical waxes that can be utilized include paraffinic, Fisher-Tropshe process, synthetic, polyethylene, polypropylene, carnuba, and the like.

The oil to be used in the composition should be compatible with the wax and a flowable liquid at room temperature. The oil can be an aromatic oil such as Dutrex 177, Dutrex 298, Dutrex 419, and Dutrex 739 (Shell Chemical Co.) or Stanflux LV (Harwick Chem Co.), a paraffinic oil such as Stan Lube 80 (Harwick Chem. Co.) or Shellflex 210, Shellflex 370, and Shellflex 790 (Shell Chem. Co.), naphthenic oils such as Shellflex 131, Shellflex 212 (Shell Chem Co.) or a synthetic oil such as dioctylphthalate, dibutylphthalate, tricrysylphosphate, and the like.

In addition, the dispersion can contain up to 60% by weight of a finely divided inert filler. The filler has a particle size generally in the range of 25 to 150 microns, and can take the form of calcium carbonate, talc, aluminum silicate, barium sulfate, silica, mica, bentonite, calcium silicate, iron oxide, aluminum powder, carbon black, zinc dust, and the like.

The dispersion can also contain up to 75% of a finely divided anti-corrosion agent, such as zinc oxide, iron oxide, zinc phosphate, barium metaborate, calcium phosphosilicate, calcium barium silicate, zinc chromate, basic lead silicochromate, zinc hydroxyphosphite, strontium chromate, metal sulfonates, and the like.

Further, small amounts up to 5% by weight of the following can be included in the composition: adhesion agents such as N-beta(aminoethyl)gammaaminopropyltrimethoxysilane; wetting agents such as pine oil, fluoroaliphatic polymeric esters, high molecular weight unsaturated polycarboxylic acids; anti-foaming agents such as methylalkylpolysiloxane and tetra(2,2 diallyoxymethyl)butyl-di(tridecyl)phosphtotitanate; thixotropes, such as organomodified tetraalkylammonium smectite montmorillomite, fumed silica, and hydrogenated caster oil derivatives; and colorants, such as titanium dioxide, iron oxide and carbon black.

In preparing the coating composition of the invention, the finely divided wax particles are mixed with the oil at room temperature to provide a dispersion. The dispersion is then applied to the article to be protected, and heated to a temperature above the melting point of the wax, generally in the range of 150° to 400° F., and preferably in the range of 180° to 250° F., to provide a homogeneous liquid coating. The heated liquid will solidify virtually instantaneously when cooled to ambient temperature to provide a solid adherent, homogeneous, corrosion resistant coating on the article.

In one form of the invention the dispersion is sprayed through a standard airless spray head onto the article with the head modified with a heating element so that the dispersion, at ambient temperature, is heated to the above named temperature range as it is sprayed onto the article.

Instead of spraying the dispersion through a heated spray head, the dispersion, at ambient temperature, can be sprayed onto the article through a non-heated airless spray head, and the coated article is then dipped in a hot water tank or heated in a steam chamber to a temperature in the range of 150° F. to 400° F. Since the coating is impervious to water, the hot water or stream can be employed to supply the heat. Alternately, after spraying the coating on the article at room temperature, the coated article can be heated in an oven to the above mentioned temperature range to homogenize the coating.

As an alternate method of applying the coating to the article, the article can be dipped in a tank of the oil/wax dispersion at room temperature. The coated article can then be heated either in a hot water tank, steam chamber or heating in an oven to the above mentioned temperature range. On cooling a solid, homogenized protective coating will result.

The following examples illustrate the manner of producing the coating of the invention.

EXAMPLE 1

A dispersion was prepared having the following composition in weight percent.

| Material | Manufacturer | % Weight |
| --- | --- | --- |
| Oil - Shellflex 210 | Shell Chemical Co. | 47.36 |
| Wax - Polymekon M | Petrolite Corp. | 23.68 |
| Anti-Corrosion Agent - Busan 11N | Buckman Laboratories | 4.74 |
| Thixotrope - Bentone 38 | NL Chemical Co. | 0.47 |
| Titanium dioxide - Tipure R-900 | Dupont Corp. | 2.37 |
| Adherence promoter - Silane A-1120 | Union Carbide Co. | 0.05 |
| Wetting agent - Florad FC-430 | 3 M Corporation | 0.02 |
| Filler(CaCo3) - Atomite | ECC Americas Inc. | 21.31 |

The dispersion at room temperature was sprayed onto a steel I-beam through a standard airless spray head which was modified to incorporate a heating element, thus heating the dispersion to a temperature of 250° F. as it was sprayed onto the article. The composition solidified upon contact with the steel beam which was at ambient temperature to provide a solid adherent coating on the steel article.

EXAMPLE 2

A mixture or dispersion was prepared having the following composition in weight percent:

| Material | Manufacturer | % Weight |
| --- | --- | --- |
| Oil - Dutrex 298 | Shell Chemical Co. | 60.79 |
| Wax - MP 26 | Micropowders, Inc. | 21.28 |
| Anticorrosion agent - Oncor M-50 | NL Chemical Co. | 15.24 |
| Thixotrope - Cabosil M-5 | Cabot Corp. | 1.22 |
| Colorant - Acetylene Black | Shawinigan Corp. | 1.22 |
| Anti-foaming agent - Antifoam A | Dow Corning Corp. | 0.32 |

A steel automotive frame section was dipped into the dispersion at room temperature and maintained in the mixture for a period of 30 seconds. The article was then removed from the dispersion and submerged in a hot water tank at a temperature of 200° F. for 1 minute to fuse the coating on the article. On cooling, after removal from the hot water tank, a solid homogeneous coating was produced.

The coating of the invention is based on the concept that finely divided particles of wax will fuse with the oil carrier when the dispersion is heated in situ to provide a solidified adherent corrosion-resistant coating on cooling. As the coating composition does not utilize an evaporable carrier, such as an organic solvent, pollution problems associated with the use of an evaporable carrier are eliminated and the drying time for the coating is substantially reduced. Further, as an evaporable carrier is not employed, shrinkage of the dried coating will not occur as with a solvent or water base coating.

The coating composition can be applied to the article at room temperature, thus eliminating the need of a large volume of molten material at high temperature as is required by a hot melt system.

Various modes of carrying out the invention are contemplated as being within the scope of the following claims particularly pointing out and distinctly claiming the subject matter which is regarded as the invention.

I claim:

1. A method of producing a protective coating on an article, comprising the steps of admixing 90% to 10% by wight of finely divided solid particles of wax with 10% to 90% by weight of an oil to form a dispersion, maintaining the dispersion free of volatile carriers, applying the dispersion at ambient temperature to an article to be protected as a coating, heating the coating on the article to an elevated temperature to provide a homogeneous liquid coating on the article, and cooling the article to provide a homogeneous solidified coating.

2. The method of claim 1, wherein the coating is heated to a temperature in the range of 150° to 400° F.

3. The method of claim 1, wherein the coating is heated to a temperature in the range of 190° to 200° F.

4. The method of claim 1, wherein said wax has a particle size in the range of 0.5 to 400 microns.

5. The method of claim 1, wherein said wax has a particle size in the range of 2 to 30 microns.

6. The method of claim 1, wherein the step of heating comprises heating the coating to a temperature above the melting point of the wax.

7. The method of calm 1, wherein the oil is flowable at ambient temperatures.

8. A method of producing a protective coating on an article, comprising the steps of admixing 90% to 10% by weight of finely divided solid particles of wax with 10% to 90% by weight of a liquid oil to form a mixture at ambient temperature, said wax having a melting point in the range of 120° F. to 350° F. and having a particle size in the range of 0.5 to 400 microns, maintaining the mixture free of evaporable carriers, applying the mixture to an article to be protected as a coating while maintaining the wax in the form of solid particles in the coating, heating the coating to a temperature in the range of 150° F. to 400° F. to fuse the wax and oil, and cooling the article to provide a solidified adherent coating on said article.

9. The method of claim 8, wherein the step of applying the mixture comprises spraying the mixture through a spray gun onto the article.

10. The method of claim 9, wherein the step of heating comprises heating the mixture as it is sprayed onto the article.

11. The method of claim 8, wherein the step of applying said mixture to the article comprises dipping the article in a bath of said mixture at an ambient temperature.

12. The method of claim 11, wherein the step of heating the mixture comprises contacting the mixture with heated water at a temperature of 150° to 400° F.

13. The method of claim 11, wherein the step of heating the mixture comprises baking the coated article in an oven at a temperature at 150° to 400° F.

14. A method of producing a protective coating on an article, comprising the steps of admixing 90% to 10% of finely divided solid particles of wax and 10% to 90% by weight of a liquid oil to form a mixture at ambient temperature, said wax having a melting point in the range of 120° F. to 350° F. and having a particle size in the range of 2 to 30 microns, maintaining the mixture free of evaporable carriers, applying the mixture at room temperature to an article to be protected as a coating while maintaining the wax in the form of solid particles in the coating, heating the coating on the article to a temperature in the range of 190° F. to 260° F. to melt the wax particles and produce a homogeneous coating on said article, and cooling the article to room temperature to form a solidified adherent homogeneous coating.

15. The method of claim 14, wherein said wax selected from the group consisting of natural wax and synthetic wax.

16. The method of claim 14, wherein said oil is selected from the group consisting of aromatic oils, paraffinic oils, naphthenic oils, and synthetic oils.

17. The method of claim 14, and including the step of admixing up to 60% by weight of a finely divided inert filler with said oil and wax.

18. The method of claim 14, including the step of admixing up to 75% by weight of a finely divided anticorrosive agent with said oil and wax.

19. A composition to be applied as a protective coating to a metal article, comprising the dispersion of finely divided wax particles in a liquid oil, said wax comprising from 10% to 90% by weight of said dispersion and said oil being the balance and being free of volatile carriers, said wax having a melting point in the range of 120° F. to 350° F., and having a particle size in the range of 0.5 to 400 microns, said dispersion being characterized by the ability to form a homogeneous solid coating on an article when applied to the article at ambient temperature and subsequently exposed to a temperature above the melting point of said wax.

20. The composition of claim 19, wherein said wax has a melting point in the range of 120° F. to 350° F., and has a particle size in the range of 2 to 30 microns.

21. The composition of claim 19, including up to 60% of a finely divided general inert filler.

22. The composition of claim 19, including up to 75% by weight of a finely divided anticorrosive agent.

* * * * *